J. DEMARCHI.
WORK HOLDER.
APPLICATION FILED NOV. 22, 1907.
967,175.
Patented Aug. 16, 1910.
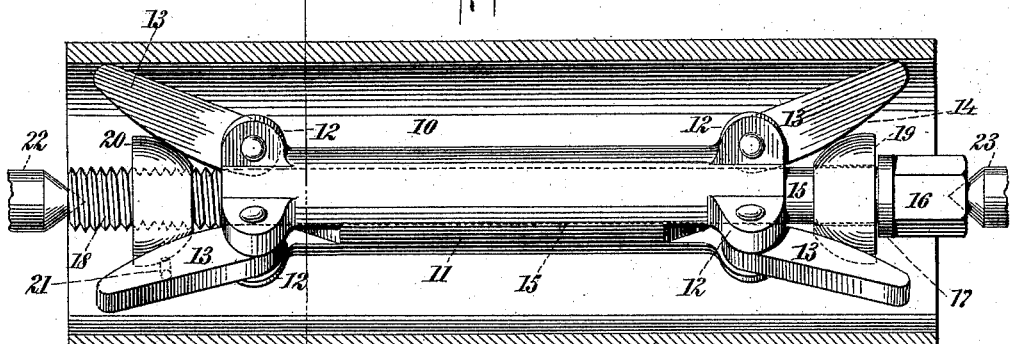
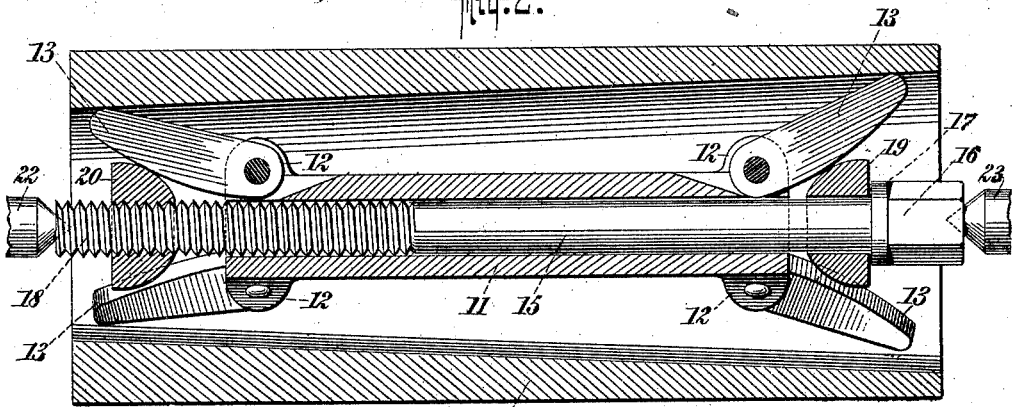
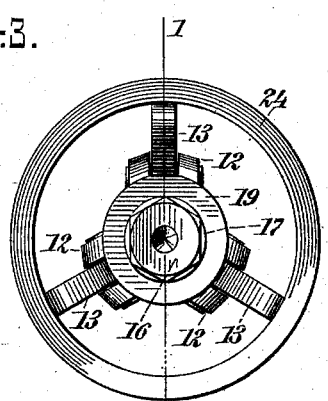
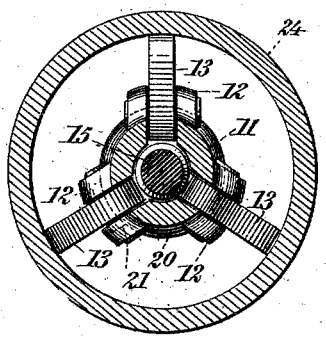
WITNESSES:
Gustave Dietrich.
Edwin N. Dietrich.
INVENTOR
Joseph Demarchi
BY Conrad A. Dietrich
his ATTORNEY
THE NORRIS PETERS CO., WASHINGTON, D. C.

UNITED STATES PATENT OFFICE.

JOSEPH DEMARCHI, OF JERSEY CITY HEIGHTS, NEW JERSEY.

WORK-HOLDER.

967,175.   Specification of Letters Patent.   Patented Aug. 16, 1910.

Application filed November 22, 1907.   Serial No. 403,270.

*To all whom it may concern:*

Be it known that I, JOSEPH DEMARCHI, residing at Jersey City Heights, county of Hudson, and State of New Jersey, have invented certain new and useful Improvements in Work-Holders, of which the following is a full, clear, and exact specification.

My invention relates to improvements in means for supporting work in lathes and analogous machinery, and the same has for its object more particularly to provide a simple, efficient and reliable device which may be easily applied to the work in order to support the same in position upon a lathe or other machine for working.

Further, said invention has for its object to provide an apparatus by means of which the work may not only be supported but properly centered in position on the lathe.

Further, said invention has for its object to provide an apparatus which may be readily applied to the interior surface of hollow bodies either in the rough or finished state, regardless of the fact whether the same are truly cylindrical or of tapering form.

Further, said invention has for its object to provide an apparatus by means of which the work may be duly supported and centered in the lathe in such a manner as to leave the ends of the work free to be operated upon or finished.

To the attainment of the aforesaid objects and ends my invention consists in the novel details of construction, and in the combination, connection and arrangement of parts hereinafter more fully described and then pointed out in the claims.

In the accompanying drawings forming part of this specification, wherein like numerals of reference indicate like parts, Figure 1 is a side view showing one form of holder constructed according to and embodying my said invention, the same being shown in position within a tubular body, which latter is shown in section; Fig. 2 is a central longitudinal section of a work holder shown in position within a body having a tapering aperture; Fig. 3 is an end view of Fig. 1 looking at the same from its right hand end, and Fig. 4 is a transverse section taken on the line 4—4 of Fig. 1, looking in the direction of the arrow.

In said drawings 10 designates the apparatus as a whole, comprising a tubular member or sleeve 11 provided at its opposite ends with three sets of lugs 12, 12, 12, which extend radially from the ends of said sleeve 11 and arranged equally distant apart. Within said lugs are pivotally secured the inner ends of arms 13, 13, 13 which have their inner or opposing surfaces curved at 14.

Within the sleeve 11 is disposed a bolt 15 having a head 16 and shoulder 17 at one end and its other end provided with screw-threads 18. The said bolt 15 fits snugly within the sleeve 11 and is adapted for longitudinal movement therein. Upon said bolt 15 adjacent to the shoulder 17 is fixed a conical member 19 whose inner surface is substantially semi-circular in outline, and upon the opposite threaded end of said bolt 15 is adjustably disposed a similar cone-shaped member 20 which is provided with a projecting pin or stud 21 adapted to contact with the inner surface of the pivoted arms 13, 13, 13 adjacent thereto.

In the accompanying drawings the apparatus is shown as supported intermediate two centers 22, 23 merely for the purpose of illustration. In actual practice the center 23 would likely be dispensed with and the head 16 of the bolt clamped in a chuck in order to rotate the holder 10 and the work thereon.

In order to adjust the work 24 upon the work holder 10 it merely becomes necessary to throw back the arms 13, 13, 13 arranged adjacent to the threaded end of the bolt 15 and thence unscrew the cone-shaped member 20 sufficiently to permit the arms when again brought into contact with the curved surface of said cone-shaped member to be introduced into the aperture in the work. Hereupon the apparatus is shifted into the desired position within the work 24 and as soon as the same has been brought to the desired position the bolt 15 is rotated until the oppositely arranged cone-shaped members are brought together and their curved surfaces brought into engagement with the curved inner surface of the arms 13, 13, 13 at the opposite ends of the sleeve 11 and the free ends of said arms forced outwardly and into engagement with the wall of the aperture in the work 24. As soon as the parts have been properly clamped in position the work may be acted upon in the manner desired.

In Fig. 2 of the drawings the apparatus is shown in position within a tapering aperture in the work 25, and in this instance, in order to firmly clamp the apparatus in position therein, it becomes necessary to first force the fixed cone-shaped member 19 upon the bolt 15 into engagement with the pivoted arms 13, 13, 13 at the end of the sleeve 11 adjacent to said fixed cone-shaped member, and thence unscrew the adjustable cone-shaped member 20 sufficiently to permit the arms 13, 13, 13 at the opposite end of the sleeve to properly fit into the tapering aperture in the work and thereupon the bolt 15 may be rotated to cause said cone-shaped member to engage the curved inner edges of said pivoted arms 13, 13, 13 and force the free ends thereof into engagement with the wall of said tapering aperture.

It will be obvious that in order to permit the device to be applied to constructions having apertures of varying diameter or widths therein the bolt 15 must be accorded a longitudinal movement within the sleeve member 11 in order that the cone-shaped members 19, 20 may simultaneously engage the sets of pivoted arms at the ends of said sleeve member at different points intermediate their pivoted and free ends. Further, it is to be noted that where tubular or other apertured bodies of considerable length are to be operated upon one apparatus may be secured therein at each end in order to support the same, but where one end of the work is clamped or held in a chuck, only one apparatus will be required in order to duly support and center the work, and this one should be secured in the end opposite to the one held in the chuck.

Having thus described my invention, what I claim and desire to secure by Letters Patent is:

1. A work holder comprising a tubular support, a plurality of pivoted members mounted at the opposite ends thereof, a shaft arranged within said tubular support and longitudinally movable therein, distending means arranged upon said shaft adapted to engage said pivoted members intermediate their free and pivoted ends whereby to force the free ends of said pivoted members into engagement with a piece of work, a connection between said shaft and certain of said distending means, whereby the rotation of said shaft produces a movement of said distending means longitudinally of said shaft, and means for holding said distending means against rotation relatively to said tubular member, substantially as specified.

2. A work holder comprising a tubular support, a plurality of pivoted members mounted at the opposite ends thereof, a shaft arranged within said tubular support and longitudinally movable therein, distending means arranged upon said shaft adapted to engage said pivoted members intermediate their free and pivoted ends, means for actuating said distending means whereby to force the free ends of said pivoted members simultaneously into engagement with a piece of work, a connection between said shaft and certain of said distending means, whereby the rotation of said shaft produces a movement of said distending means longitudinally of said shaft, and means for holding said last-named distending means against rotation relatively to said tubular member, substantially as specified.

3. A work holder comprising a tubular support, a plurality of pivoted members mounted at opposite ends thereof, a shaft arranged within said tubular portion and longitudinally movable therein, distending means arranged upon said shaft adapted to engage said pivoted members intermediate their free and pivoted ends whereby to force the free ends of said pivoted members into engagement with a piece of work, a connection between one of said distending means and said shaft adapted to adjust said last-named distending means longitudinally of said shaft, and means arranged upon said adjustable distending means for holding the same against rotation relatively to said tubular member, substantially as specified.

4. A work holder comprising a tubular support, a plurality of pivoted members mounted at the opposite ends thereof, a shaft arranged within said tubular support and longitudinally movable therein, said shaft being provided at one end with a screw-threaded portion, distending means arranged upon said shaft adapted to engage said pivoted members intermediate their free and pivoted ends whereby to force the free ends of said pivoted members into engagement with a piece of work, one of said distending means engaging the threaded portion of said shaft and adapted for adjustment longitudinally of said shaft, and means arranged upon said adjustable distending means for holding the same against rotation relatively to said tubular member, substantially as specified.

5. A work holder comprising a tubular support, a plurality of pivoted members mounted at the opposite ends thereof, a shaft arranged within said tubular support and longitudinally movable therein, means arranged upon said shaft adapted to engage said pivoted members intermediate their free and pivoted ends whereby to force the free ends of said pivoted members into engagement with a piece of work, means for imparting to a part of the means arranged upon said shaft, a movement longitudinally of said shaft, and a stop for holding the movable part of said means against rotation relatively to said tubular support, substantially as specified.

6. A work holder comprising a tubular support, a plurality of pivoted members mounted at the opposite ends thereof, a shaft arranged within said tubular support and longitudinally movable therein, means arranged upon said shaft adapted to simultaneously engage said pivoted members at different points intermediate their free and pivoted ends whereby to force the free ends of one set of said pivoted members outward to a different degree than the free ends of the pivoted members at the opposite ends of said support and cause said free ends to engage a piece of work, means for imparting to a part of the means arranged upon said shaft a movement longitudinally of said shaft, and means for holding said movable part engaging one set of said pivoted members against rotation relatively to said tubular support, substantially as specified.

7. A work holder comprising a tubular member, a plurality of pivoted members mounted at the ends thereof, and extending outwardly therefrom, a shaft loosely disposed in said tubular member having a head at one end and screw threads at its opposite end, a cone arranged upon said shaft adjacent to the head thereon, a cone adjustably mounted to work upon the threaded end of said shaft, and means for holding said adjustable cone against rotation relatively to said tubular member, substantially as specified.

8. A work holder comprising a tubular member provided at its opposite ends with outwardly projecting lugs, a plurality of arms pivotally mounted intermediate said lugs, and extending outwardly therefrom, a shaft disposed in said tubular member and adapted for longitudinal movement therein, said shaft having a head at one end and screw-threads provided at its opposite end, a cone arranged upon said shaft adjacent to said head, and a cone mounted upon the threaded end of said shaft and adapted for movement longitudinally thereof, and a stop on said cone extending outwardly therefrom adapted to engage the pivoted arms arranged upon said sleeve whereby to prevent the rotation of said adjustable cone relatively to said tubular member, substantially as specified.

9. A work holder comprising a tubular member provided at its opposite ends with lugs, a plurality of radial arms pivotally secured in said lugs and extending laterally outward therefrom said arms having their inner edges curved from their pivoted ends toward their free ends, a shaft disposed in said tubular member and adapted for longitudinal movement therein, said shaft having a head at one end and its opposite end screw-threaded; a cone rigidly secured to said shaft adjacent to the head thereon, and a cone adjustably mounted to work upon the threaded end of said shaft, and a stop on said adjustable cone adapted for contact with the inner edges of the pivoted arms adjacent thereto whereby to prevent the rotation of said adjustable cone relatively to said tubular member, said cones being adapted when forced toward each other to engage the inner curved edges of said pivoted members whereby to force the free ends of the arms at each end of said tubular member outwardly and into engagement with the work, substantially as specified.

Signed at the city of New York, in the county and State of New York, this eighteenth day of November, nineteen hundred and seven.

JOSEPH DEMARCHI.

Witnesses:
CONRAD A. DIETERICH,
A. R. ANGUS.